(12) United States Patent
Waggoner

(10) Patent No.: US 11,776,502 B1
(45) Date of Patent: Oct. 3, 2023

(54) USING VARIABLE REFRESH RATE TO SEAMLESSLY ADAPT TO ARBITRARY AND VARIABLE VIDEO FRAME RATES

(71) Applicant: Amazon Technologies, Inc., Seattle, WA (US)

(72) Inventor: Charles Benjamin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 115 days.

(21) Appl. No.: 17/468,141

(22) Filed: Sep. 7, 2021

(51) Int. Cl.
  *G09G 5/12* (2006.01)
  *G09G 5/00* (2006.01)
  *H04N 19/146* (2014.01)

(52) U.S. Cl.
  CPC ............ *G09G 5/005* (2013.01); *G09G 5/006* (2013.01); *G09G 5/12* (2013.01); *H04N 19/146* (2014.11)

(58) Field of Classification Search
  CPC .......... G09G 5/005; G09G 5/006; G09G 5/12; H04N 19/146
  See application file for complete search history.

(56) References Cited

U.S. PATENT DOCUMENTS

| 9,584,787 B1 * | 2/2017 | Belovay | ............... H04L 65/613 |
| 2020/0135146 A1 * | 4/2020 | Lee | ........................ G09G 5/006 |
| 2020/0193915 A1 * | 6/2020 | Noh | ..................... G09G 3/3266 |

* cited by examiner

*Primary Examiner* — Robert J Michaud
(74) *Attorney, Agent, or Firm* — NICHOLSON DE VOS WEBSTER & ELLIOTT LLP

(57) ABSTRACT

Techniques for using variable refresh rate to seamlessly adapt to arbitrary and variable video frame rates are described. According to some embodiments, a computer-implemented method includes receiving, by a media player, a video entirely encoded at a fixed frame rate, decoding the encoded video into a rendered video at the fixed frame rate with a video decoder of the media player, setting a display and a display interface that is to output the rendered video to the display to a variable refresh rate mode that synchronizes a refresh rate of the display to a varying frame rate of rendered frames, sending the rendered video at the fixed frame rate from the media player to the display interface, sending the rendered video from the display interface to the display at the fixed frame rate when the display interface is in the variable refresh rate mode, and displaying the rendered video on the display at the fixed frame rate when the display is in the variable refresh rate mode.

20 Claims, 9 Drawing Sheets

USING VARIABLE REFRESH RATE TO SEAMLESSLY ADAPT TO ARBITRARY AND VARIABLE VIDEO FRAME RATES

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

DETAILED DESCRIPTION

Figure 1:
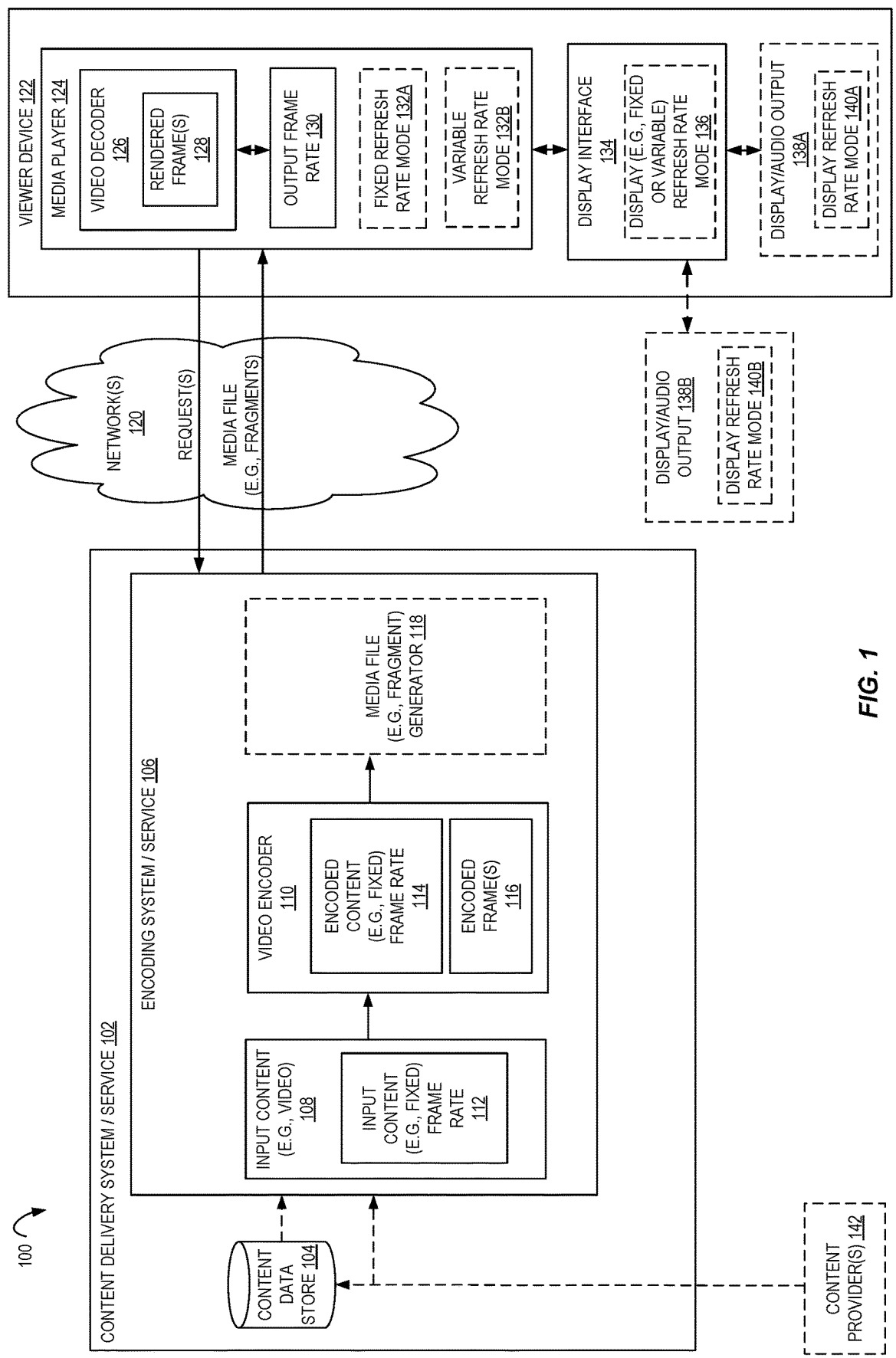
FIG. 1 is a diagram illustrating an environment including a content delivery system/service to send an encoded media file to a viewer device supporting a variable refresh rate mode according to some embodiments.

The present disclosure relates to methods, apparatus, systems, and non-transitory computer-readable storage media for using variable refresh rate to seamlessly adapt to arbitrary and variable video frame rates. In certain embodiments, a playback device includes a variable refresh rate mode to allow synchronization of a refresh rate of the display to a varying frame rate of (e.g., rendered) frames to be displayed. Embodiments herein utilize a variable refresh rate mode to instead display fixed frame rates, for example, even when a frame rate is arbitrary and/or even when a frame rate varies in a single media file, e.g., a single movie or television (TV) episode. Certain encoded content has a fixed (e.g., fixed before encode time) frame rate. Video (e.g., film) comes in a variety of (e.g., fixed) frame rates, certain examples (e.g., supported by a High-Definition Multimedia Interface (HDMI) standard for TV input) include 23.976, 24, 25, 29.97, 30, 50, 59.94 and 60 frames per second (fps). Some other speeds, including 18 fps for silent films and 48 fps for certain other films are not supported by an audio/video interface (e.g., display interface) standard, such as, but not limited to, a HDMI standard and/or a DisplayPort standard from the Video Electronics Standards Association (VESA). Certain displays (e.g., computer and/or mobile device displays) run at (e.g., have a refresh rate of) 60 fps, and some high-speed displays capable of 90, 120, or 144 fps.

Converting between content (e.g., encoded) frame rates and display refresh rates has been very challenging for many decades. Embodiments herein overcome these challenges.

Certain content (e.g., fixed) frame rate(s) are converted for displaying on a display at a refresh rate by repeating one or more frame(s). For example, if there is an integer ratio of the frame rate to the refresh rate, in certain embodiments the content (e.g., fixed) frame rate is converted to match the refresh rate by duplicating one or more frames (e.g., content frame rates of 24 fps and 30 fps are converted for use on a display operating at 120 fps refresh rate by duplicating each frame 5 times and 4 times, respectively). Embodiments herein use variable refresh rate to avoid converting content frame rate to a (e.g., predetermined) display refresh rate. Certain content frame rate(s) are converted for displaying on a display at a refresh rate by repeating different frames in an alternating pattern, e.g., a content frame rate of 24 fps is converted for use on a display operating at 60 fps by repeating the source frames an alternating pattern of 2 times for certain (e.g., odd numbered) frames and 3 times for (e.g., even numbered) other frames. However, this introduces some judder in certain embodiments. Embodiments herein use variable refresh rate to avoid including a repeated frame and/or a pattern of repeated frames from the source video. Certain frame rate(s) are not supported by certain refresh rate(s), for example, there is no simple mathematical solution for supporting non-integer ratios of the frame rate to the refresh rate, e.g., where a refresh rate of 60 fps is not supported by a frame rate of 25 fps. One solution is to repeat every certain (e.g., $5^{th}$) frame, but this causes a jerky appearance in certain embodiments. Another solution is to utilize frame blending and motion synthesis techniques, but these do not yield results having a visual quality as good as the original in certain embodiments. Embodiments herein use variable refresh rate to support previously unsupported frame rate(s), e.g., non-integer ratios of the frame rate to the refresh rate. In certain embodiments, the (e.g., encoded) frame rate of a (e.g., encoded) video is included as metadata with that (e.g., encoded) video.

Personal computer (PC) and console games typically have variable (e.g., inconsistent) rendering rates (in sharp contrast to a video that has a fixed (e.g., consistent) rendering rate) such that a frame coming even 1 millisecond (ms) late will not be seen for 16.7 ms (e.g., the refresh period) on a 60 fps display. In certain embodiments, video game content addresses this problem with variable refresh rate technology, e.g., where the display synchronizes with frames as rendered (e.g., the display synchronizes with the rendering rate), e.g., a frame that is 1 ms late is only delayed by 1 ms. In certain embodiments, a display supports variable refresh rate technology, e.g., a variable refresh rate mode. Additionally or alternatively, in certain embodiments, a display interface (e.g., port) supports variable refresh rate technology, e.g., a variable refresh rate mode. In certain embodiments, a display interface includes physically circuitry to couple a display to a media player (e.g., video decoder thereof). In certain embodiments, the media player provides the display with the frame rate, e.g., one of a plurality of frame rates supported in variable refresh rate mode.

Embodiments herein utilize a variable refresh rate mode (e.g., of a display interface and/or display) for media playback to avoid frame rate conversions and/or to play arbitrary frame rate content without any loss in visual quality (e.g., perfectly), including non-supported (e.g., non-HDMI) frame rates, such as, but not limited to 18 and 48 fps. In certain embodiments, as frames are rendered (e.g., decoded and composited), they are sent out to the display at precise intervals (e.g., "29.97" fps=30000/1001 fps ms) apart by the playback device in a variable refresh rate mode. In certain embodiments, a playback device delays or drops frame(s), and embodiments herein allow the playback device in a variable refresh rate mode to (e.g., dynamically) synchronize the refresh with the receipt of a frame, for example, where a (e.g., 1 ms) delay results in a frame displayed only that amount of time (e.g., 1 ms) late, instead of waiting until the next periodic refresh in a fixed refresh rate mode (e.g., 16.7 ms in the example discussed above).

In certain embodiments, even with a display that supports the content (e.g., fixed) frame rate, changing the output frame rate (e.g., from the video decoder) requires a request of a display interface (e.g., HDMI) to reset (e.g., a reset that is visible to a human), typically resulting in several seconds of black or otherwise no content. Since the duration of the reset varies by display, output devices delay the start of playback for the worst-case delay in certain embodiments. Embodiments herein use variable refresh rate to avoid a reset (e.g., a reset of hardware and/or software from a first refresh rate to a second, different refresh rate), e.g., no reset will be required, so content can immediately start irrespective of output/content frame rate.

Embodiments herein use variable refresh rate to allow a media player to render secondary content (e.g., user experience content), that is to be overlaid on the video, at the same frame rate (or an integer multiple of that frame rate). This allows media players to reduce compute and power usage when playing slower frame rates.

In certain embodiments, an encoded video (e.g., that is not a video game) includes different fixed frame rates therein, for example, a documentary mixing a first frame rate (e.g., 24 fps) of film clips and a different second frame rate (e.g., 60 fps) of video interviews. Instead of conforming this (e.g., streaming) content to a single fps, resulting in a loss of smooth motion for content not at the conformed frame rate, embodiments herein use variable refresh rate such that true variable frame rate content can be encoded, streamed, and/or displayed without any conformance requirement.

Certain embodiments herein are implemented with hardware and/or software that operates according to a variable refresh rate standard (e.g., a "variable refresh rate" mode of the standard), for example, but not limited to, AMD FreeSync, NVIDIA G-Sync, VESA Adaptive-Sync, HDMI (e.g., 2.1) Variable Refresh Rate (VRR), Apple ProMotion, or Qualcomm Q-Sync. Certain embodiments herein modify variable refresh rate technology for use in outputting a fixed frame rate, for example, fixed for an entire title (e.g., media file). In certain embodiments, this includes allowing for use of a variable refresh mode even when the media is determined to have a fixed frame rate.

FIG. 1 is a diagram illustrating an environment 100 including a content delivery system/service 102 to send an encoded media file 118 to a viewer device 122 supporting a variable refresh rate mode 132B according to some embodiments. Encoding system/service 106 may operate in accordance with a video encoding standard.

In certain embodiments, input content 108 (e.g., video) has a given frame rate 112, e.g., the frame rate as provided by content provider(s) 142. In certain embodiments, video encoder 110 is to encode the input content 108 (e.g., frames thereof) into encoded frame(s) 116 at an encoded content (e.g., fixed) frame rate 114, e.g., where the encoded content frame rate 114 is the same as the input content frame rate 112. In certain embodiments, encoded content (e.g., a single media file) has a plurality of frame rates 114, e.g., one proper subset of a video file having a first (e.g., fixed) frame rate and a second proper subset of the video file having a varying frame rate (e.g., according to a variable refresh rate mode of a video encoding standard).

In certain embodiments, encoding compresses a video file (e.g., input content (e.g., frame(s)) 108) into a plurality of encoded (e.g., compressed) frames 116, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and the preceding and/or following frames to specify its content). For example, with P-frames and B-frames being inter-coded pictures. In one embodiment, each single I-frame includes a plurality of inter-coded frames (e.g., P-frames and/or B-frames), e.g., as a group of pictures (GOP).

The depicted content delivery system/service 102 includes a content data store 104, which may be implemented in one or more data centers. In one embodiment, the input content (e.g., media file) (e.g., video file that is to be viewed by the viewer device 122) is accessed (for example, from the content data store 104 or directly from a content provider 142, e.g., as a live stream) by video encoder 110 (e.g., by media file (e.g., fragment) generator 118). In certain embodiments, the (e.g., client) viewer device 122 requesting the media file (e.g., fragment(s) of media) from content delivery system/service 102 causes the encoding system/service 106 (e.g., video encoder 110 thereof) to encode the video file, e.g., into a compressed format for transmittal on network(s) 120 to viewer device 122. In certain embodiments, the media file generator 118 generates one or more subsets (e.g., frames, fragments, segments, scenes, etc.) of the media file (e.g., video), e.g., beginning with accessing the media file and generating the requested media (e.g., fragment(s)). In one embodiment, each fragment includes a plurality of video frames.

Figure 8:
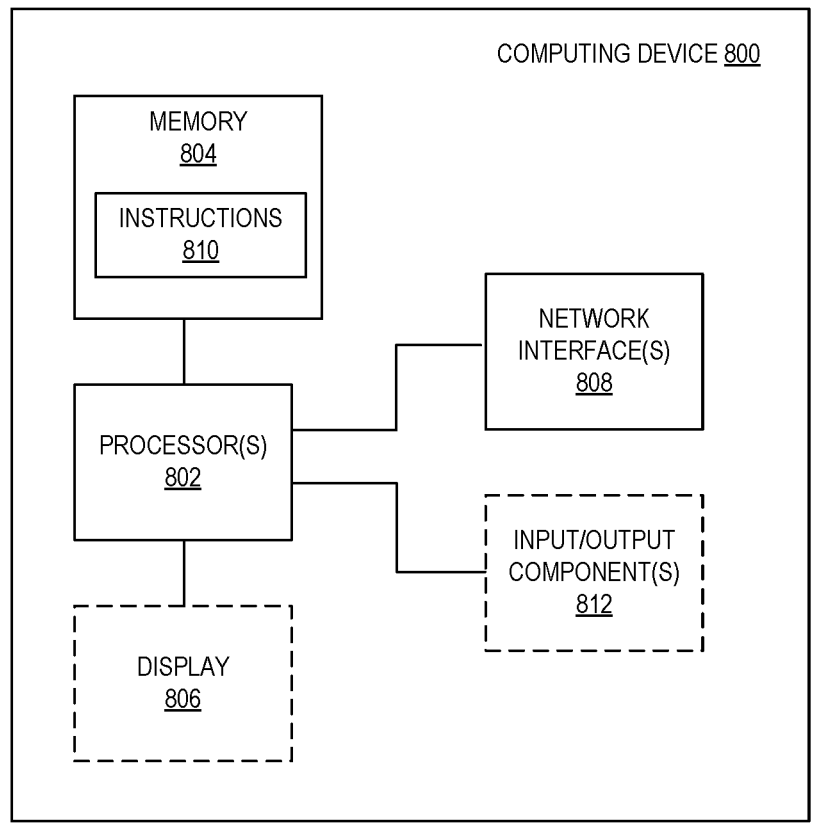
FIG. 8 illustrates a logical arrangement of a set of general components of an exemplary computing device that can be utilized in accordance with various embodiments.

In FIG. 1, content delivery system/service 102 is coupled to viewer device 122 via one or more networks 120, e.g., a cellular data network or a wired or wireless local area network (WLAN). In certain embodiments, viewer device 122 is a computing device 800 as depicted in FIG. 8.

In certain embodiments, viewer device 122 sends a request for media file to content delivery system/service 102 (e.g., media file generator 118 thereof) and in response, content delivery system/service 102 (e.g., media file generator 118 thereof) sends (e.g., streams) the encoded frames 116 (e.g., in one or more fragments). In certain embodiments, viewer device includes a media player 124 having a video decoder 126 to decode the media file (e.g., fragment) from the content delivery system/service 102 into decoded (e.g., rendered) frames 128, e.g., to display video and/or audio of the media file on display and/or audio output 138A and/or 138B, respectively. In certain embodiments, display and/or audio output 138A is within viewer device 122 (e.g., display of a smartphone, tablet, etc.) and/or display and/or audio output 138B is external from the viewer device 122 (e.g., a display of a personal computer, a television, etc.).

In certain embodiments, it is desired to output (e.g., render) the encoded content (e.g., encoded frames 116) from the display 138A and/or 138B at a rate that is the same as the frame rate 114, for example, such that frame rate 114 of the input content 108 is the same as the output frame rate 130 from the media player 124. In certain embodiments, the rendered frames 128 are output from (e.g., rendered by) the media player 124 at the output frame rate 130.

In certain embodiments, the viewer device 122 (e.g., media player 124) has an interface to select between a fixed refresh rate mode 132A and a variable refresh rate mode 132B, e.g., with one example of that being shown as within the media player 124.

In certain embodiments, viewer device 122 (e.g., media player 124) determines that the input content (e.g., encoded frames 116) to be displayed has a fixed frame rate 114 and it is to be output with the output frame rate 130 being the fixed frame rate 114. In certain embodiments, this can be accomplished via setting the viewer device 122 into the fixed refresh rate mode 132A (e.g., with the display performing periodic refreshes without control by the media player 124), e.g., but is subject to the issues discussed above. In certain embodiments, the issues discussed above are avoided by outputting a fixed frame rate video using variable refresh rate, e.g., via setting the viewer device 122 into the variable refresh rate mode 132B (e.g., with the display performing periodic refreshes under the control of the media player 124).

In certain embodiments, the viewer device 122 being in the variable refresh rate mode 132B causes (e.g., causes the media player 124 to cause) the display interface 134 to be in variable (e.g., and not fixed) refresh rate mode 136, display 138A to be in variable (e.g., and not fixed) refresh rate mode 140A, and/or display 138B to be in variable (e.g., and not fixed) refresh rate mode 140B. In certain embodiments, display interface 134 allows the media player 124 to instruct the display the frame rate to be utilized and/or to refresh the display on receipt of a next frame from the media player 124. In certain embodiments, display interface 134 operates according to an audio/video interface (e.g., display interface) standard, such as a DisplayPort standard or an HDMI standard (e.g., HDMI 2.1). In certain embodiments, instead of the display interface 134 using fixed refresh rate mode 136 for a video encoded at a fixed frame rate, the display interface 134 uses variable refresh rate mode 136 for the video (e.g., entirely) encoded at a fixed frame rate, e.g., and the variable refresh rate functionality allows the media player 124 to (i) avoid converting content frame rate to a (e.g., predetermined) display refresh rate, (ii) avoid including a repeated frame or repeated frames pattern from the source video, (iii) support previously unsupported frame rate(s), e.g., non-integer ratios of the frame rate to the refresh rate, (iv) provide the display with the frame rate, e.g., one of a plurality of frame rates supported in variable refresh rate mode, and/or (v) synchronize the refresh with the receipt of a frame (e.g., without a reset of the display interface and/or display), for example, where a delay results in a frame displayed only that amount of time late, instead of waiting until the next periodic refresh in a fixed refresh rate mode. Certain embodiments herein do not make the video decoder 126 synchronize its frame rate with the speed of the display's refresh rate. Certain embodiments herein allow for playback of a recording of content (e.g., a video game) where the content has a variable refresh rate, e.g., without converting that video to a fixed frame rate.

In certain embodiments, the refresh of a frame is a progressive (e.g., non-interlaced) refresh of the entire frame (e.g., entire display) and not an interlaced refresh. In certain embodiments, a display interface in variable refresh rate mode is capable of selecting a range of refresh rates of the display (e.g., without a reset), e.g., between the minimum refresh rate and maximum refresh rate or any proper subset thereof.

Figure 2:
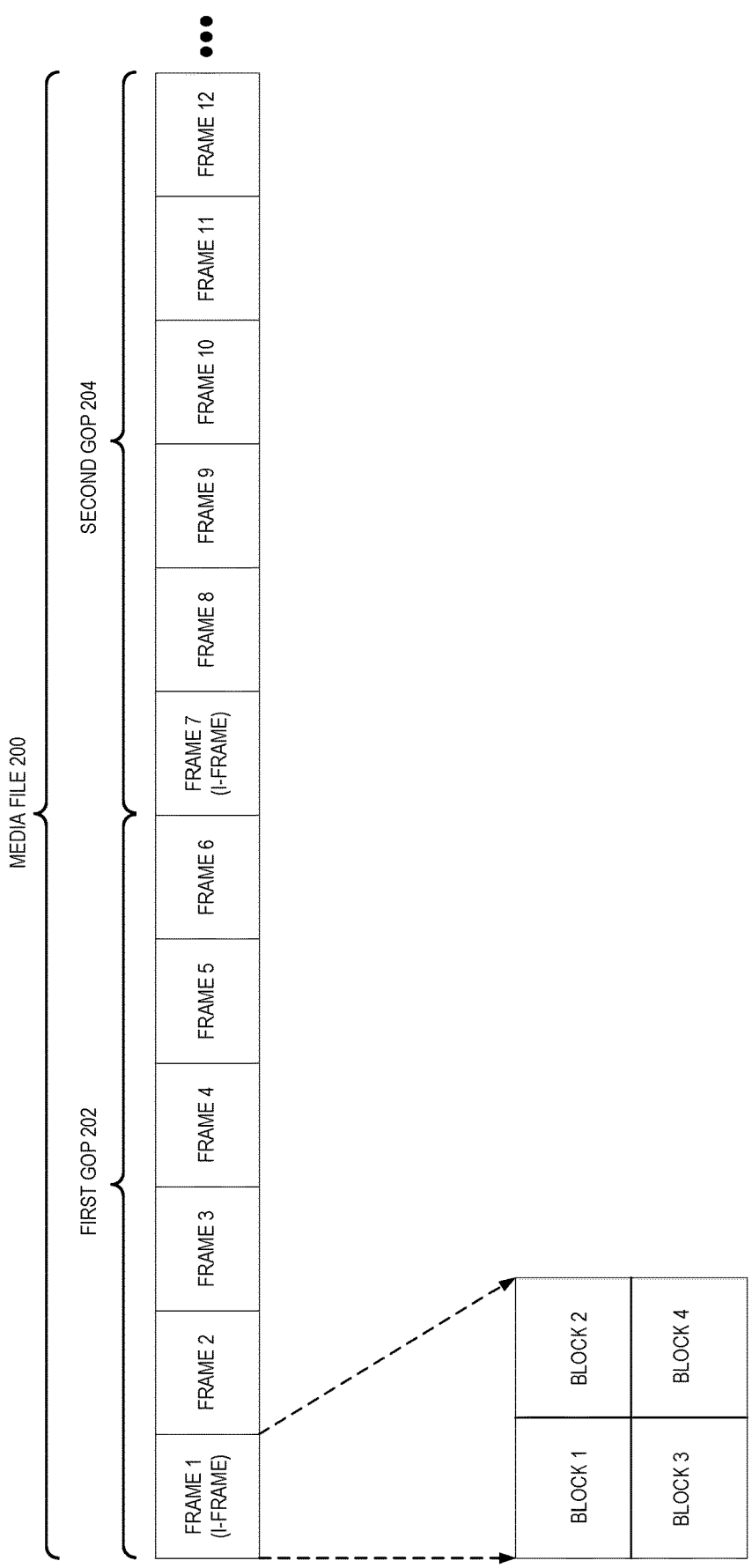
FIG. 2 is a diagram illustrating a media file having a plurality of groups of pictures, and a frame formed from a plurality of blocks (e.g., macroblocks) according to some embodiments.

FIG. 2 is a diagram illustrating a media file 200 having a plurality of groups of pictures 202, 204, and a frame (e.g., frame 1) formed from a plurality of blocks (e.g., blocks 1-4) (e.g., macroblocks) according to some embodiments. The number of scenes, GOPs (frames therein), and blocks are merely examples, e.g., it should be understood that any number of scenes, GOPs (frames therein), and blocks may be utilized.

In certain embodiments, the frame rate is the number of frames that are to be displayed for a given time period, e.g., in frames per second.

Figure 3:
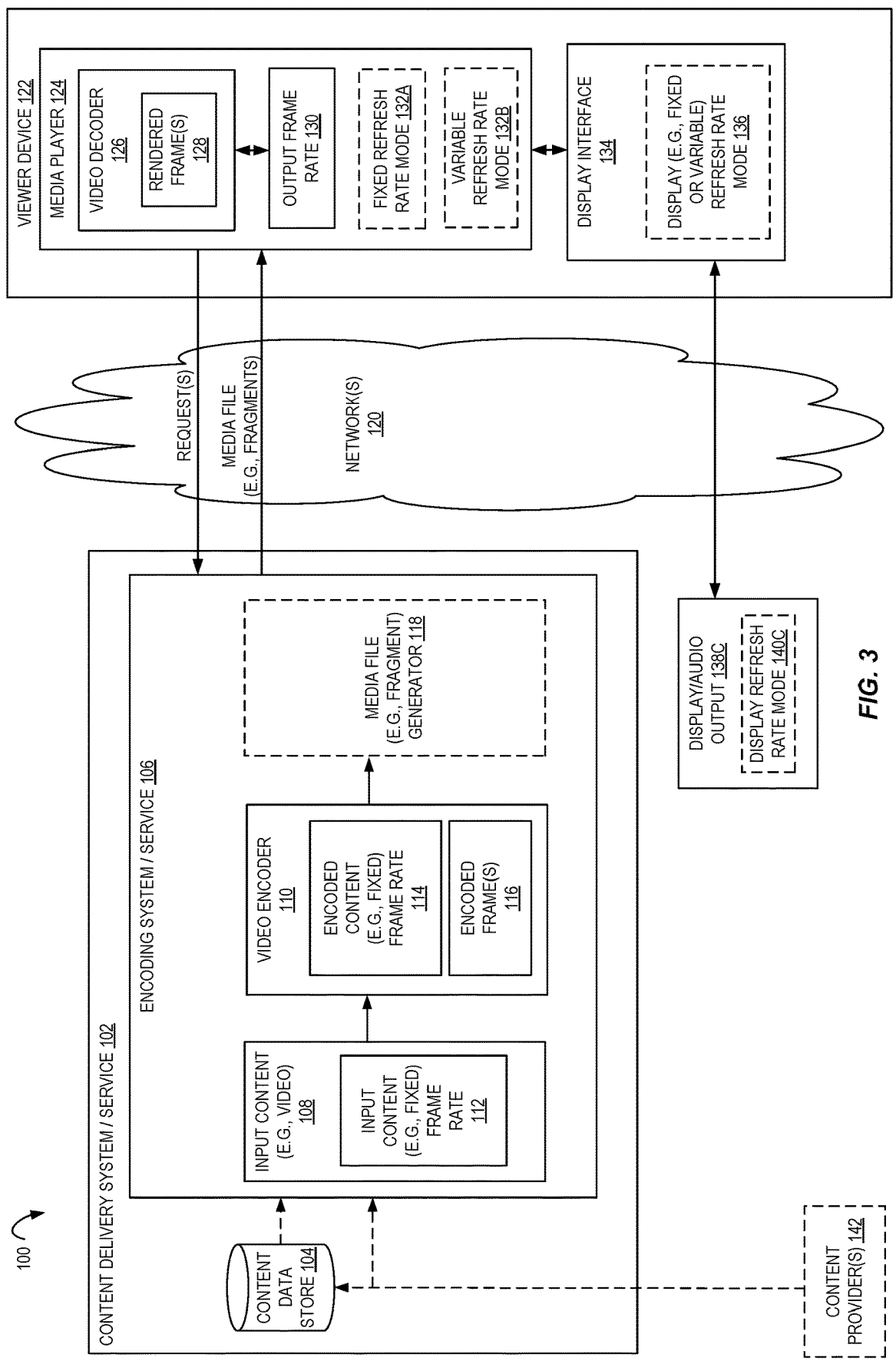
FIG. 3 is a diagram illustrating an environment including a content delivery system/service to send an encoded media file to a viewer device supporting a variable refresh rate mode and coupled to a remote display via a network according to some embodiments.

FIG. 3 is a diagram illustrating an environment including a content delivery system/service 102 to send an encoded media file 118 to a viewer device 122 supporting a variable refresh rate mode 132B and coupled to a remote display 138C via a network 120 according to some embodiments. In reference to FIG. 1, FIG. 3 illustrates a remote display 138C that allows the (e.g., wireless) transmittal (e.g., "casting") of rendered frames 128 to display 138C, e.g., being in variable refresh rate mode 140C.

Figure 4:
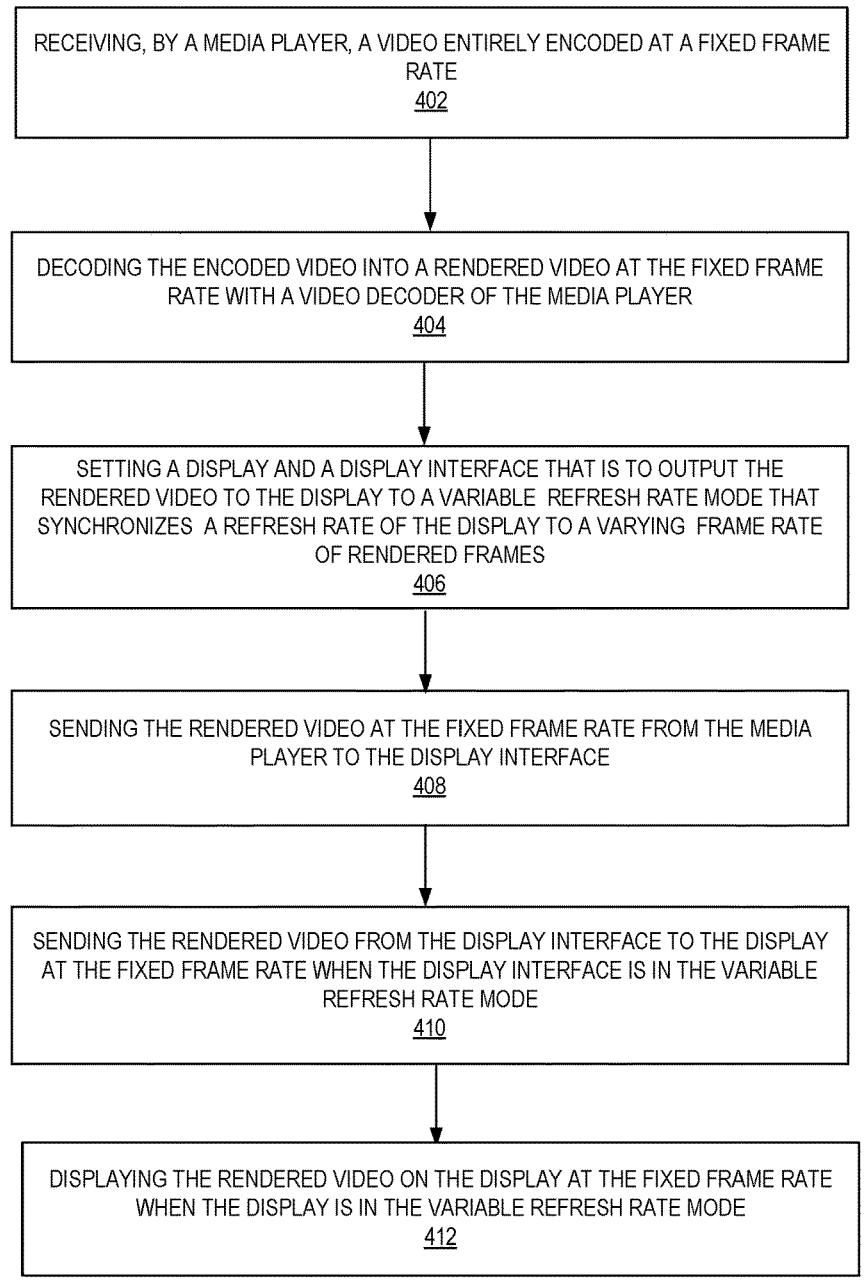
FIG. 4 is a flow diagram illustrating operations of a method for using a variable refresh rate mode to seamlessly adapt to arbitrary and variable video frame rates according to some embodiments.

FIG. 4 is a flow diagram illustrating operations 400 of a method for using a variable refresh rate mode to seamlessly adapt to arbitrary and variable video frame rates according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by a viewer device (or a component thereof) of the other figures.

The operations 400 include, at block 402, receiving, by a media player, a video entirely encoded at a fixed frame rate. The operations 400 further include, at block 404, decoding the encoded video into a rendered video at the fixed frame rate with a video decoder of the media player. The operations 400 further include, at block 406, setting a display and a display interface that is to output the rendered video to the display to a variable refresh rate mode that synchronizes a refresh rate of the display to a varying frame rate of rendered frames. The operations 400 further include, at block 408, sending the rendered video at the fixed frame rate from the media player to the display interface. The operations 400 further include, at block 410, sending the rendered video from the display interface to the display at the fixed frame rate when the display interface is in the variable refresh rate mode. The operations 400 further include, at block 412, displaying the rendered video on the display at the fixed frame rate when the display is in the variable refresh rate mode.

Exemplary environments, systems, etc. that the above may be used in are detailed below.

At least some embodiments of the disclosed technologies can be described in view of the following examples:

Example 1. A computer-implemented method comprising:
receiving, by a media player, a video entirely encoded at a fixed frame rate;
decoding the encoded video into a rendered video at the fixed frame rate with a video decoder of the media player;
setting a display and a display interface that is to output the rendered video to the display to a variable refresh rate mode that synchronizes a refresh rate of the display to a varying frame rate of rendered frames;
sending the rendered video at the fixed frame rate from the media player to the display interface;
sending the rendered video from the display interface to the display at the fixed frame rate when the display interface is in the variable refresh rate mode; and
displaying the rendered video on the display at the fixed frame rate when the display is in the variable refresh rate mode.

Example 2. The computer-implemented method of example 1, wherein the encoded video is not converted from the fixed frame rate to a different frame rate, and the rendered video is not converted from the fixed frame rate to a different frame rate.

Example 3. The computer-implemented method of example 1, wherein the fixed frame rate is not supported by a fixed refresh rate mode of the display interface.

Example 4. A computer-implemented method comprising:
receiving, by a media player, a video encoded at a fixed frame rate;
decoding the encoded video into a rendered video at the fixed frame rate with a video decoder of the media player;
setting a display interface, that is to output the rendered video to a display, to a variable refresh rate mode that synchronizes a refresh rate of the display to a varying frame rate of rendered frames;
sending the rendered video at the fixed frame rate from the media player to the display interface; and
sending the rendered video from the display interface to the display at the fixed frame rate when the display interface is in the variable refresh rate mode.

Example 5. The computer-implemented method of example 4, wherein the encoded video is not converted from the fixed frame rate to a different frame rate, and the rendered video is not converted from the fixed frame rate to a different frame rate.

Example 6. The computer-implemented method of example 4, wherein the fixed frame rate is not supported by a fixed refresh rate mode of the display interface.

Example 7. The computer-implemented method of example 4, wherein the fixed frame rate is not an integer ratio of a maximum refresh rate of the display and/or the display interface.

Example 8. The computer-implemented method of example 4, wherein the rendered video sent from the display interface to the display does not include a repeated frame from the encoded video.

Example 9. The computer-implemented method of example 4, wherein the video is not a video game.

Example 10. The computer-implemented method of example 4, further comprising:
receiving, by the media player, a second video encoded at a different second fixed frame rate supported by a fixed refresh rate mode of the display interface;
switching the display interface from the variable refresh rate mode to the fixed refresh rate mode;
decoding the encoded second video into a rendered second video at the different second fixed frame rate with the video decoder of the media player;
sending the rendered second video at the different second fixed frame rate from the media player to the display interface; and
sending the rendered second video from the display interface to the display at the different second fixed frame rate when the display interface is in the fixed refresh rate mode.

Example 11. The computer-implemented method of example 4, wherein, when the display interface is in the variable refresh rate mode, a delay in the decoding of a frame of the encoded video into a frame of the rendered video causes a corresponding delay in a refresh sent by the display interface to the display for the frame of the rendered video.

Example 12. The computer-implemented method of example 4, wherein the video encoded at the fixed frame rate is a first proper subset of a single media file, and further comprising:
receiving, by the media player, a second video encoded at a different second fixed frame rate that is a second proper subset of the single media file;
decoding the encoded second video into a rendered second video at the different second fixed frame rate with the video decoder of the media player;
sending the rendered second video at the different second fixed frame rate from the media player to the display interface; and
sending the rendered second video from the display interface to the display at the different second fixed frame rate when the display interface is in the variable refresh rate mode.

Example 13. The computer-implemented method of example 12, wherein a change from the sending of the rendered video from the display interface to the display at the fixed frame rate to the sending the rendered second video from the display interface to the display at the different second fixed frame rate does not cause a visible reset of the display interface.

Example 14. The computer-implemented method of example 12, wherein the receiving, by the media player, of the single media file is receiving a single stream from a network.

Example 15. An apparatus comprising:
a media player to receive a video encoded at a fixed frame rate and comprising a video decoder to decode the encoded video into a rendered video at the fixed frame rate; and
a display interface coupled to the media player, wherein the media player is to set the display interface, that is to output the rendered video to a display, to a variable refresh rate mode that synchronizes a refresh rate of the display to a varying frame rate of rendered frames, and cause the rendered video at the fixed frame rate to be sent from the media player to the display interface, and the rendered video to be sent from the display interface to the display at the fixed frame rate when the display interface is in the variable refresh rate mode.

Example 16. The apparatus of example 15, wherein the encoded video is not to be converted from the fixed frame rate to a different frame rate, and the rendered video is not to be converted from the fixed frame rate to a different frame rate.

Example 17. The apparatus of example 15, wherein the fixed frame rate is not supported by a fixed refresh rate mode of the display interface.

Example 18. The apparatus of example 15, wherein the fixed frame rate is not an integer ratio of a maximum refresh rate of the display and/or the display interface.

Example 19. The apparatus of example 15, wherein the rendered video to be sent from the display interface to the display does not include a repeated frame from the encoded video.

Example 20. The apparatus of example 15, wherein, when the display interface is in the variable refresh rate mode, a delay in the decode of a frame of the encoded video into a frame of the rendered video causes a corresponding delay in a refresh sent by the display interface to the display for the frame of the rendered video.

Figure 5:
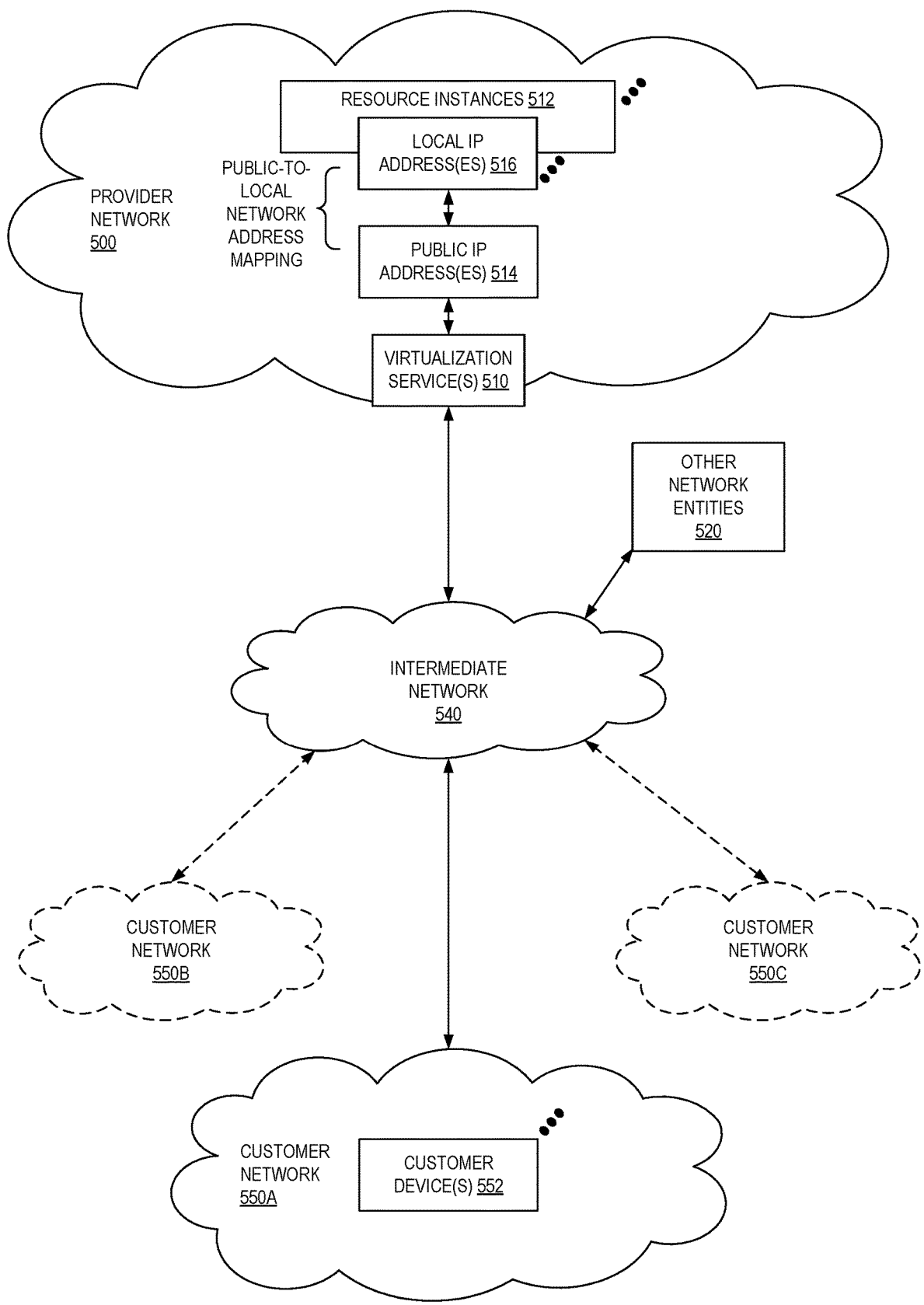
FIG. 5 illustrates an example provider network environment according to some embodiments.

FIG. 5 illustrates an example provider network (or "service provider system") environment according to some embodiments. A provider network 500 may provide resource virtualization to customers via one or more virtualization services 510 that allow customers to purchase, rent, or otherwise obtain instances 512 of virtualized resources, including but not limited to computation and storage resources, implemented on devices within the provider network or networks in one or more data centers. Local Internet Protocol (IP) addresses 516 may be associated with the resource instances 512; the local IP addresses are the internal network addresses of the resource instances 512 on the provider network 500. In some embodiments, the provider network 500 may also provide public IP addresses 514 and/or public IP address ranges (e.g., Internet Protocol version 4 (IPv4) or Internet Protocol version 6 (IPv6) addresses) that customers may obtain from the provider 500.

Conventionally, the provider network 500, via the virtualization services 510, may allow a customer of the service provider (e.g., a customer that operates one or more client networks 550A-550C including one or more customer device(s) 552) to dynamically associate at least some public IP addresses 514 assigned or allocated to the customer with particular resource instances 512 assigned to the customer. The provider network 500 may also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of customer network(s) 550A-550C may, for example, implement customer-specific applications and present the customer's applications on an intermediate network 540, such as the Internet. Other network entities 520 on the intermediate network 540 may then generate traffic to a destination public IP address 514 published by the customer network(s) 550A-550C; the traffic is routed to the service provider data center, and at the data center is routed, via a network substrate, to the local IP address 516 of the virtualized computing resource instance 512 currently mapped to the destination public IP address 514. Similarly, response traffic from the virtualized computing resource instance 512 may be routed via the network substrate back onto the intermediate network 540 to the source entity 520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 500; a customer may then assign their allocated public IP addresses to particular resource instances allocated to the customer. These public IP addresses may be referred to as customer public IP addresses, or simply customer IP addresses. Instead of being assigned by the provider network 500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
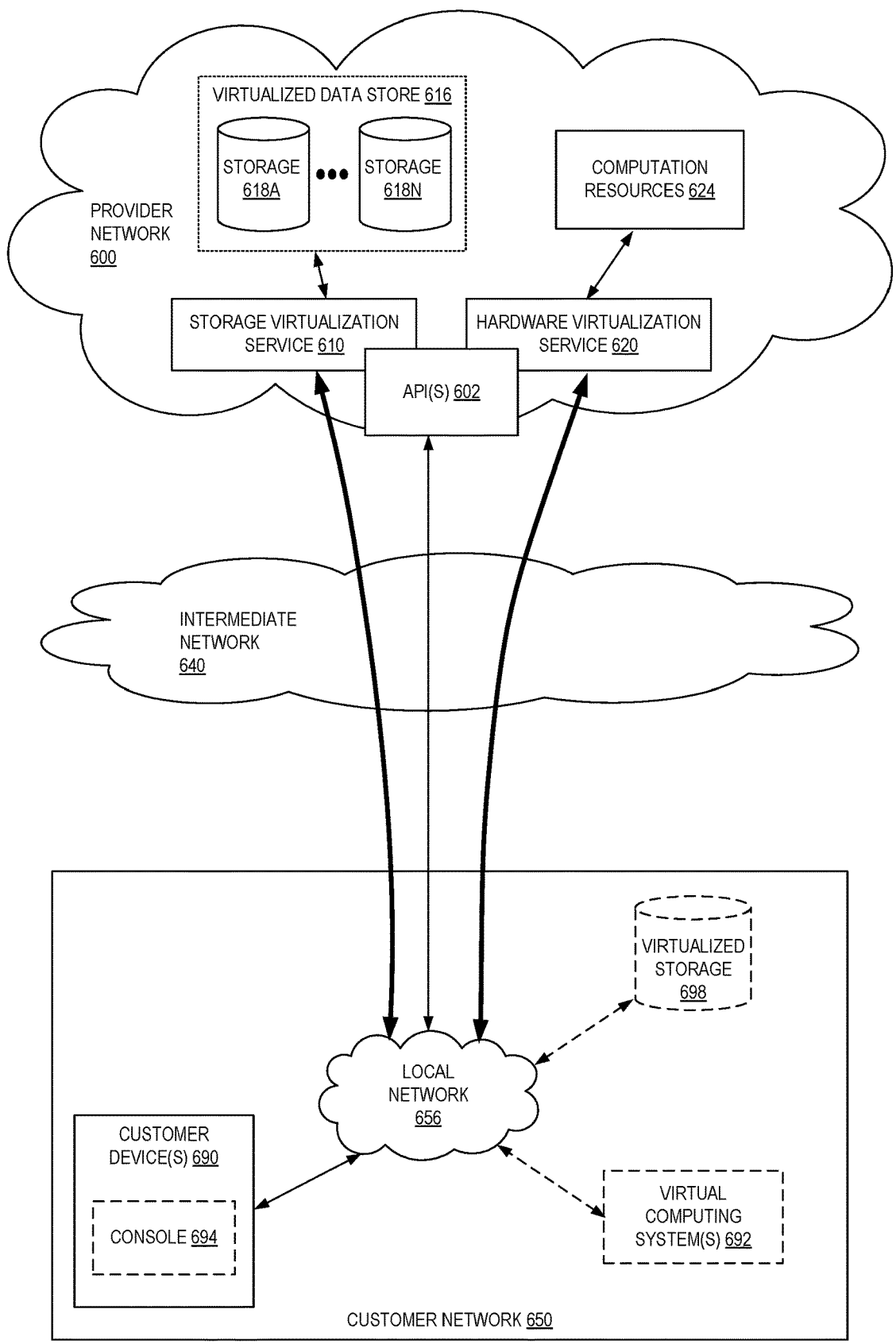
FIG. 6 is a block diagram of an example provider network that provides a storage service and a hardware virtualization service to customers according to some embodiments.

FIG. 6 is a block diagram of an example provider network that provides a storage service and a hardware virtualization service to customers, according to some embodiments. Hardware virtualization service 620 provides multiple computation resources 624 (e.g., VMs) to customers. The computation resources 624 may, for example, be rented or leased to customers of the provider network 600 (e.g., to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (e.g., a web-based application, standalone application, mobile application, etc.). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (e.g., via console 694), the customer may access the functionality of storage service 610, for example via one or more APIs 602, to access data from and store data to storage resources 618A-618N of a virtual data store 616 (e.g., a folder or "bucket", a virtualized volume, a database, etc.) provided by the provider network 600. In some embodiments, a virtualized data store gateway (not shown) may be provided at the customer network 650 that may locally cache at least some data, for example frequently accessed or critical data, and that may communicate with storage service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes via storage service 610 acting as a storage virtualization service, and these volumes may appear to the user as local (virtualized) storage 698.

Figure 7:
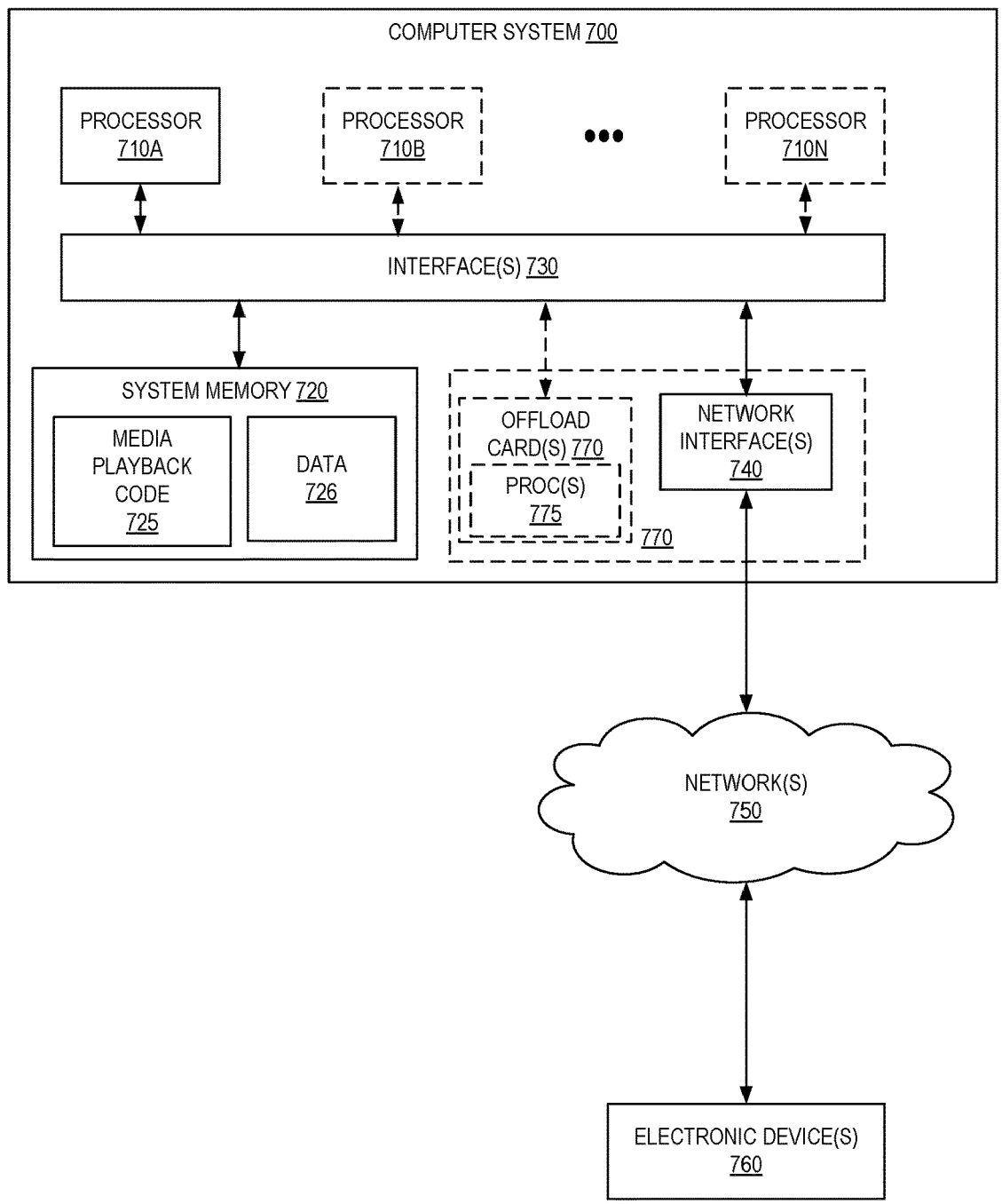
FIG. 7 is a block diagram illustrating an example computer system that may be used in some embodiments.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.
Illustrative System In some embodiments, a system that implements a portion or all of the techniques for content indexing as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 720 as media playback code 725 (e.g., executable to implement, in whole or in part, the methods discussed herein) and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (e.g., operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (e.g., upon a request from a hypervisor) that is executed by the other processors 710A-710N of the computer system 700. However, in some embodiments the virtualization manager implemented by the offload card(s) 770 can accommodate requests from other entities (e.g., from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

FIG. 8 illustrates a logical arrangement of a set of general components of an example computing device 800. Generally, a computing device 800 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 802 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 804) to store code (for example, instructions 810, e.g., which implement a content delivery service as disclosed herein), and a set of one or more wired or wireless network interfaces 808 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 804) of a given electronic device typically stores code (e.g., instructions 810) for execution on the set of one or more processors 802 of that electronic device. One or more parts of various embodiments may be implemented using different combinations of software, firmware, and/or hardware.

A computing device 800 can include some type of display element 806, such as a touch screen or liquid crystal display (LCD), although many devices such as portable media players might convey information via other means, such as through audio speakers, and other types of devices such as server end stations may not have a display element 806 at all. As discussed, some computing devices used in some embodiments include at least one input and/or output component(s) 812 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 9:
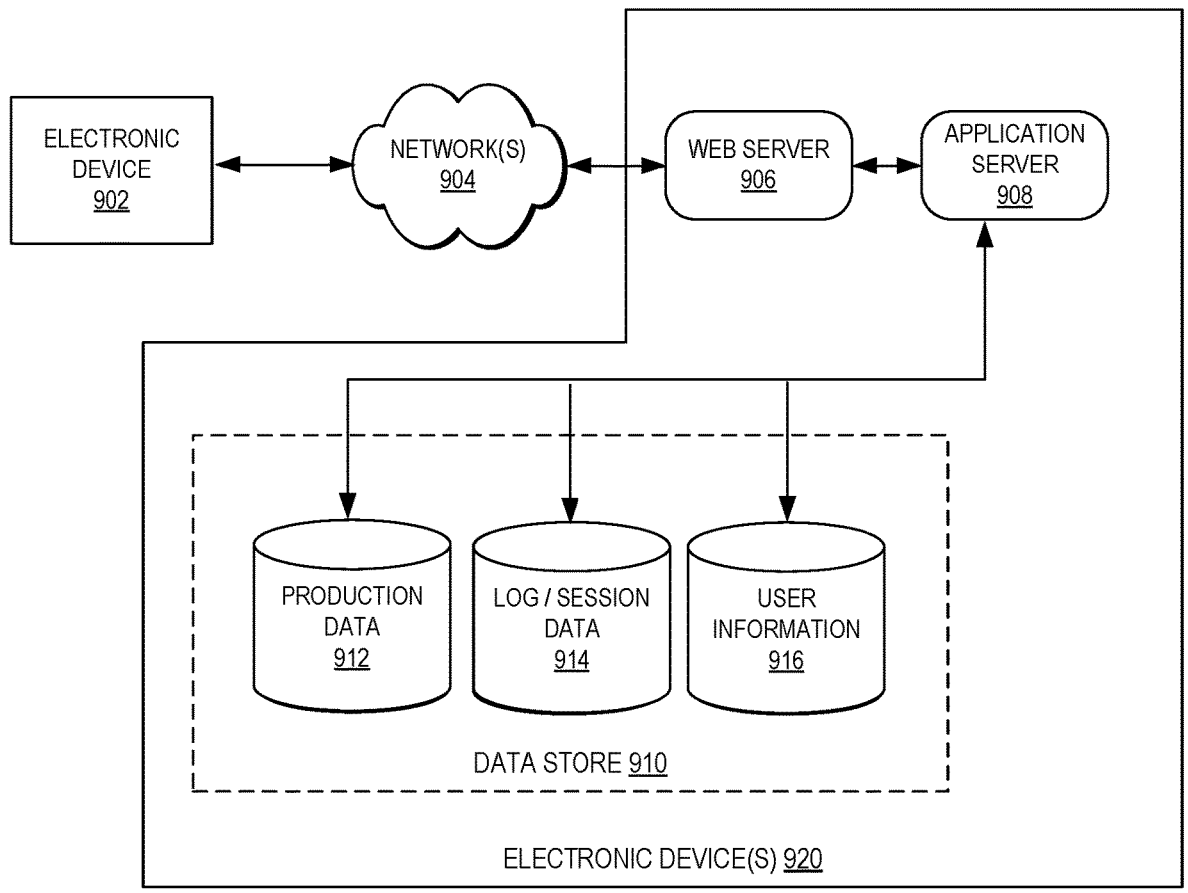
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. For example, in some embodiments messages are HyperText Transfer Protocol (HTTP) requests that are received by a web server (e.g., web server 906), and the users, via electronic devices, may interact with the provider network via a web portal provided via the web server 906 and application server 908. As will be appreciated, although a web-based environment is used for purposes of explanation, different environments may be used, as appropriate, to implement various embodiments. The system includes an electronic client device 902, which may also be referred to as a client device and can be any appropriate device operable to send and receive requests, messages, or information over an appropriate network 904 and convey information back to a user of the device 902. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 904 includes the Internet, as the environment includes a web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device 902 and handling a majority of the data access and business logic for an application. The application server 908 provides access control services in cooperation with the data store 910 and is able to generate content such as text, graphics, audio, video, etc., to be transferred to the client device 902, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 902 and the application server 908, can be handled by the web server 906. It should be understood that the web server 906 and application server 908 are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store 910 also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store 910 might access the user information 916 to verify the identity of the user and can access a production data 912 to obtain information about items of that type. The information can then be returned to the user, such as in a listing of results on a web page that the user is able to view via a browser on the user device 902. Information for a particular item of interest can be viewed in a dedicated page or window of the browser.

The web server 906, application server 908, and/or data store 910 may be implemented by one or more electronic devices 920, which can also be referred to as electronic server devices or server end stations and may or may not be located in different geographic locations. Each of the one or more electronic devices 920 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 618A-618N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a media player, a video encoded at a fixed frame rate that is a first proper subset of a single media file;
decoding the encoded video into a rendered video at the fixed frame rate with a video decoder of the media player;
setting a display interface, that is to output the rendered video to a display, to a variable refresh rate mode that synchronizes a refresh rate of the display to a varying frame rate of rendered frames;
sending the rendered video at the fixed frame rate from the media player to the display interface;
sending the rendered video from the display interface to the display at the fixed frame rate when the display interface is in the variable refresh rate mode;
receiving, by the media player, a second video encoded at a different second fixed frame rate that is a second proper subset of the single media file;
decoding the encoded second video into a rendered second video at the different second fixed frame rate with the video decoder of the media player;

sending the rendered second video at the different second fixed frame rate from the media player to the display interface; and sending the rendered second video from the display interface to the display at the different second fixed frame rate when the display interface is in the variable refresh rate mode.

2. The computer-implemented method of claim 1, wherein the encoded video is not converted from the fixed frame rate to a different frame rate, and the rendered video is not converted from the fixed frame rate to a different frame rate.

3. The computer-implemented method of claim 1, wherein the fixed frame rate is not supported by a fixed refresh rate mode of the display interface.

4. The computer-implemented method of claim 1, wherein the fixed frame rate is not an integer ratio of a maximum refresh rate of the display.

5. The computer-implemented method of claim 1, wherein the rendered video sent from the display interface to the display does not include a repeated frame from the encoded video.

6. The computer-implemented method of claim 1, wherein the video is not a video game.

7. The computer-implemented method of claim 1, further comprising:
receiving, by the media player, a third video encoded at a different third fixed frame rate supported by a fixed refresh rate mode of the display interface;
switching the display interface from the variable refresh rate mode to the fixed refresh rate mode;
decoding the encoded third video into a rendered third video at the different third fixed frame rate with the video decoder of the media player;
sending the rendered third video at the different third fixed frame rate from the media player to the display interface; and
sending the rendered third video from the display interface to the display at the different third fixed frame rate when the display interface is in the fixed refresh rate mode.

8. The computer-implemented method of claim 1, wherein, when the display interface is in the variable refresh rate mode, a delay in the decoding of a frame of the encoded video into a frame of the rendered video causes a corresponding delay in a refresh sent by the display interface to the display for the frame of the rendered video.

9. The computer-implemented method of claim 1, wherein a change from the sending of the rendered video from the display interface to the display at the fixed frame rate to the sending the rendered second video from the display interface to the display at the different second fixed frame rate does not cause a visible reset of the display interface.

10. The computer-implemented method of claim 1, wherein the receiving, by the media player, of the single media file is receiving a single stream from a network.

11. An apparatus comprising:
a media player to receive a video encoded at a fixed frame rate and comprising a video decoder to decode the encoded video into a rendered video at the fixed frame rate; and
a display interface coupled to the media player, wherein the media player is to set the display interface, that is to output the rendered video to a display, to a variable refresh rate mode that synchronizes a refresh rate of the display to a varying frame rate of rendered frames, and cause the rendered video at the fixed frame rate to be sent from the media player to the display interface, and the rendered video to be sent from the display interface to the display at the fixed frame rate when the display interface is in the variable refresh rate mode, wherein, when the display interface is in the variable refresh rate mode, a delay in the decode of a frame of the encoded video into a frame of the rendered video causes a corresponding delay in a refresh sent by the display interface to the display for the frame of the rendered video.

12. The apparatus of claim 11, wherein the encoded video is not to be converted from the fixed frame rate to a different frame rate, and the rendered video is not to be converted from the fixed frame rate to a different frame rate.

13. The apparatus of claim 11, wherein the fixed frame rate is not supported by a fixed refresh rate mode of the display interface.

14. The apparatus of claim 11, wherein the fixed frame rate is not an integer ratio of a maximum refresh rate of the display.

15. The apparatus of claim 11, wherein the rendered video to be sent from the display interface to the display does not include a repeated frame from the encoded video.

16. A computer-implemented method comprising:
receiving, by a media player, an encoded video;
decoding the encoded video into a rendered video with a video decoder of the media player;
setting a display interface, that is to output the rendered video to a display, to a variable refresh rate mode that synchronizes a refresh rate of the display to a varying frame rate of rendered frames;
sending the rendered video from the media player to the display interface; and
sending the rendered video from the display interface to the display, wherein, when the display interface is in the variable refresh rate mode, a delay in the decode of a frame of the encoded video into a frame of the rendered video causes a corresponding delay in a refresh sent by the display interface to the display for the frame of the rendered video.

17. The computer-implemented method of claim 16, wherein the encoded video is encoded at a fixed frame rate, the encoded video is not converted from the fixed frame rate to a different frame rate, and the rendered video is not converted from the fixed frame rate to a different frame rate.

18. The computer-implemented method of claim 16, wherein the rendered video sent from the display interface to the display does not include a repeated frame from the encoded video.

19. The computer-implemented method of claim 16, wherein the video is not a video game.

20. The computer-implemented method of claim 16, further comprising:
receiving, by the media player, a second video encoded at a different frame rate than a frame rate of the encoded video;
decoding the encoded second video into a rendered second video at the different frame rate with the video decoder of the media player;
sending the rendered second video at the different frame rate from the media player to the display interface; and
sending the rendered second video from the display interface to the display at the different frame rate when the display interface is in the variable refresh rate mode.

* * * * *